May 10, 1927.
P. A. HABERL
1,627,643
LINE GUIDE FOR FISHING RODS
Filed July 30, 1926
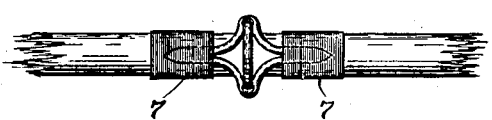
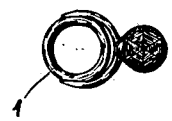
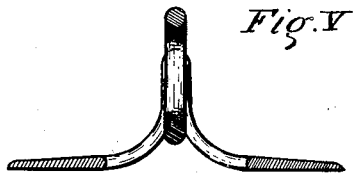
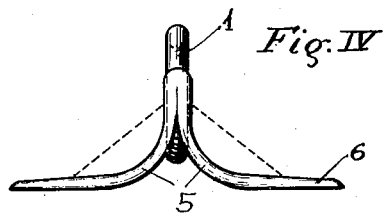
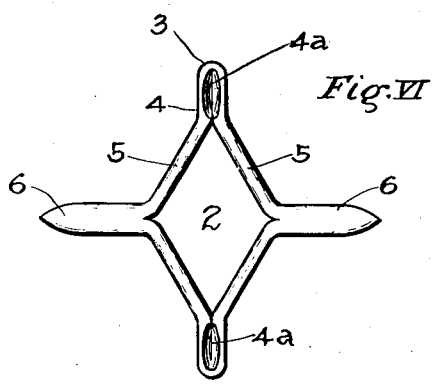
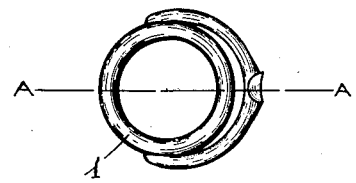
Paul A. Haberl
INVENTOR.
BY Whitehead & Vogt
by Carl Whitehead
ATTORNEYS.

Patented May 10, 1927.

1,627,643

UNITED STATES PATENT OFFICE.

PAUL A. HABERL, OF DENVER, COLORADO.

LINE GUIDE FOR FISHING RODS.

Application filed July 30, 1926. Serial No. 125,991.

The invention relates to line guides or line eyes for fishing rods and particularly to that class of such guides or eyes as have a ring or loop eye carried by a wire-like support mounted on the rod.

An object of the invention is to provide, in a line guide of the class described, a more rigid, stronger and more durable structure.

A further object is to provide, in a line guide of the class described, a structure which will lessen the number of the surfaces of the guide against which the line will bear or rub in passing through the guide.

Other objects and advantages will appear from the following detailed description taken in conjunction with the accompanying drawings wherein the same reference numerals indicate corresponding parts throughout the several views, and wherein—

Figure I is a plan showing the device attached to a fragment of a fishing rod.

Figure II is an end elevation of Fig. I.

Figure III is a side elevation of Fig. I.

Figure IV is an enlarged elevation of the device.

Figure V is a longitudinal section on line A—A of Fig. VII.

Figure VI is a plan of the support for the eye as the same appears before it is bent into its final form.

Figure VII is an enlarged view of the device in the same position as in Fig. II but unattached to the rod.

Fish rod line guides, in which a loop or eye is supported by a wire-like structure mounted on the rod, are and for a long time have been in common use but such guides are of a flimsy and unsubstantial construction and are so formed that in passing through the guide the line will frequently bear and rub upon parts of the support. While the eye is usually made of material the smoothness of which is affected little or none by the friction of the line, the supporting members are made of cheaper and softer material which wears and roughens by such friction and this roughness in turn damages the line so that both line and support are damaged.

My improved structure eliminates these defects and forms a line guide of great rigidity, strength and durability and is so constructed that in the ordinary and usual passage of the line through the guide, the line will bear upon or rub against only a single surface, to-wit: the interior of the eye through which the line passes.

My guide is formed in two parts, namely, the eye or ring 1 and the supporting member 2 shown in Fig. VI, the parts of which will be separately indicated.

The support is formed preferably of two pieces of wire, each of which is bent or doubled upon itself as at 3, the two sides of the bend continuing parallel to each other for the desired distance as at 4 and therefrom separating and forming two sides of a V as at 5, the end portion 6 of each wire being bent from the top of the V to a direction which is perpendicular to the longitudinal axis of the parallel portion 4 of the wires. Two wires thus bent are placed adjacent each other in the position indicated at Fig. VI and the end portions 6 are then soldered and swaged together and flattened as shown in Figs. III, IV, V, VI and VII. Thus is formed the flat supporting member shown in Fig. VI and designated generally as 2.

Between the parallel wires at 4 there is a depression or groove resulting from the roundness of the wires and this depression or groove is indicated at 4$^a$. This natural groove between the two parallel wires may be and preferably is enlarged by swaging.

The parallel portion 4 and the V shaped portion 5 of the wire-like support are then bent upwardly into rounded or circular shape, as clearly shown in Figs. II and VII, and in this position the depressions 4$^a$ constitute opposed seats for the reception of any suitable ring or eyelet 1 and it will be noted that by reason of the length of the depressions 4$^a$ and the curvature of the portion 4, when bent into the shape illustrated in Figs. II and VII, the seats 4$^a$ will engage a considerable extent of the outer surface of the ring or eye 1 whereby the ring or eye 1 will be snugly and firmly held in and by the said seats. The ring or eye 1 is thereupon soldered into the said seats to prevent the manual or accidental displacement of the ring from the seats.

By forming the seats for the ring, as above described, I add to the strength and durability of the guide in two ways, first, by providing two opposed seats of a considerable longitudinal extent which firmly and snugly grip and hold the ring or eye between them, and, secondly, I provide extensive adjacent surfaces of the supporting member and the ring for the application of solder for permanently joining these two parts together. In other words, I provide a new and improved structure for more securely and substantially seating the ring in the supporting member and at the same time provide improved and more extensive surfaces for the application of solder for permanently securing the ring in the support, both of these improvements resulting from the forming of the opposed and longitudinally extending seats, preferably accomplished by bringing wires into parallel relation as above described.

In the line guides now in use, formed of a wire structure supporting a loop of wire, the wires of the supporting structure rise from the pole in inverted V shape, the point or apex of the V being attached commonly by solder to the sides of the ring or eye at a point substantially midway the height of the ring. The position of the V shaped sides of the support as in common use, as compared with the sides of the support in my improved guide, is indicated by dotted lines in Fig. IV wherefrom it will be apparent that said V shaped sides of the support of the line guide, as now in common use, rise from the pole at such an angle and to such a height that when the line sags in passing through the line guide it will bear and rub against such V shaped sides of the support as well as against the ring 1.

From Fig. IV it will be apparent that by forming the longitudinally extensive seats for the eyelet, as in my improved structure, the point of divergence of the V shaped sides of the support is very substantially lowered and the V shaped sides diverge only slightly until they extend nearly to the bottom of the ring. This structure places the side bars of the supporting member outside of the area of movement of the line as it passes through the line guide and, even when the line sags, it will not be brought into contact with or rub against the sides of the supporting member.

It will be understood that when the ends 6 of the members constituting the support are swaged together they are, by such swaging, flattened to the extent necessary for attachment to the fishing pole by the ordinary thread winding indicated at 7 in Figs. I and III.

It is obvious that a supporting member similar to that illustrated in Fig. VI may be formed by mechanical expedients other than bending and swaging wire but it is thought that the formation of the support by bending and swaging wires, as above described, is the preferable method.

I claim:

1. A line guide for fishing rods comprising a supporting member having means for attachment thereof to the rod and having opposed upstanding portions, seats in said portions adapted to engage an eyelet and an eyelet positioned in said seats.

2. A line guide for fishing rods comprising a supporting member fixedly attached to the rod and having opposed upstanding portions, elongated arcuate grooves in said opposed portions and an eyelet seated in said grooves.

3. In a line guide for fishing rods, an eyelet-supporting structure attached to the rod, having upstanding opposed eyelet-engaging members, each of said members comprising an upper portion having an elongated seat therein for the eyelet and a lower bifurcated portion.

4. In a line guide for fishing rods an eyelet-supporting structure attached to the rod, having upstanding opposed eyelet-engaging members, each of said members comprising a stem standing substantially perpendicular to the axis of the rod and a bifurcated portion the parts of which diverge from the lower end of said stem to said rod.

5. In a line guide for fishing rods an eyelet-supporting structure attached to the rod, having upstanding opposed eyelet-engaging members, each of said members comprising a stem standing substantially perpendicular to the axis of the rod and a bifurcated portion the parts of which diverge from the lower end of said stem and at a point approximately the same distance from the rod as the bottom of the inside of the eyelet.

6. In a line guide for fishing rods, an eyelet-supporting structure attached to the rod, having upstanding opposed eyelet engaging members, each of said members comprising a stem substantially perpendicular to the axis of the rod and having a seat therein for said eyelet, and a bifurcated portion the parts of which diverge from the lower end of said stem to said rod at a point approximately the same distance from the rod as the bottom of the inside of the eyelet.

In testimony whereof I affix my signature.

PAUL A. HABERL.